United States Patent Office 3,276,967
Patented Oct. 4, 1966

3,276,967
NUCLEAR FUEL UNIT
John Alan Dodd, Culcheth, Warrington, England, assignor to Societe Anglo-Belge Vulcain S.A., Brussels, Belgium
Filed Apr. 15, 1964, Ser. No. 359,961
Claims priority, application Great Britain, Apr. 25, 1963, 16,302/63
3 Claims. (Cl. 176—66)

This invention relates to nuclear fuel units and more particularly to end fittings carried by nuclear fuel units to secure the units to a fuel support grid.

The present invention provides, in one of its aspects, a nuclear fuel unit having an end fitting to secure the unit to a fuel support grid wherein the end fitting comprises a threaded spindle to penetrate an aperture in the grid, a shoulder to limit this penetration, a threaded nut to be screwed onto the spindle, the co-operating threads on the nut and the spindle being discontinuous and capable of disengagement by partial rotation of the nut to permit axial displacement of the nut, and locking means to counter rotation of the nut on the spindle. Preferably the locking means comprises a part carried by the nut which part is reversibly deformable into locking engagement with a recess in the spindle. An end fitting embodying this invention is particularly suited to secure a fuel unit to a support grid in a marine nuclear reactor in which movement of fuel units with respect to the support grid under the effect of ship movement is to be restrained.

Figure 1:
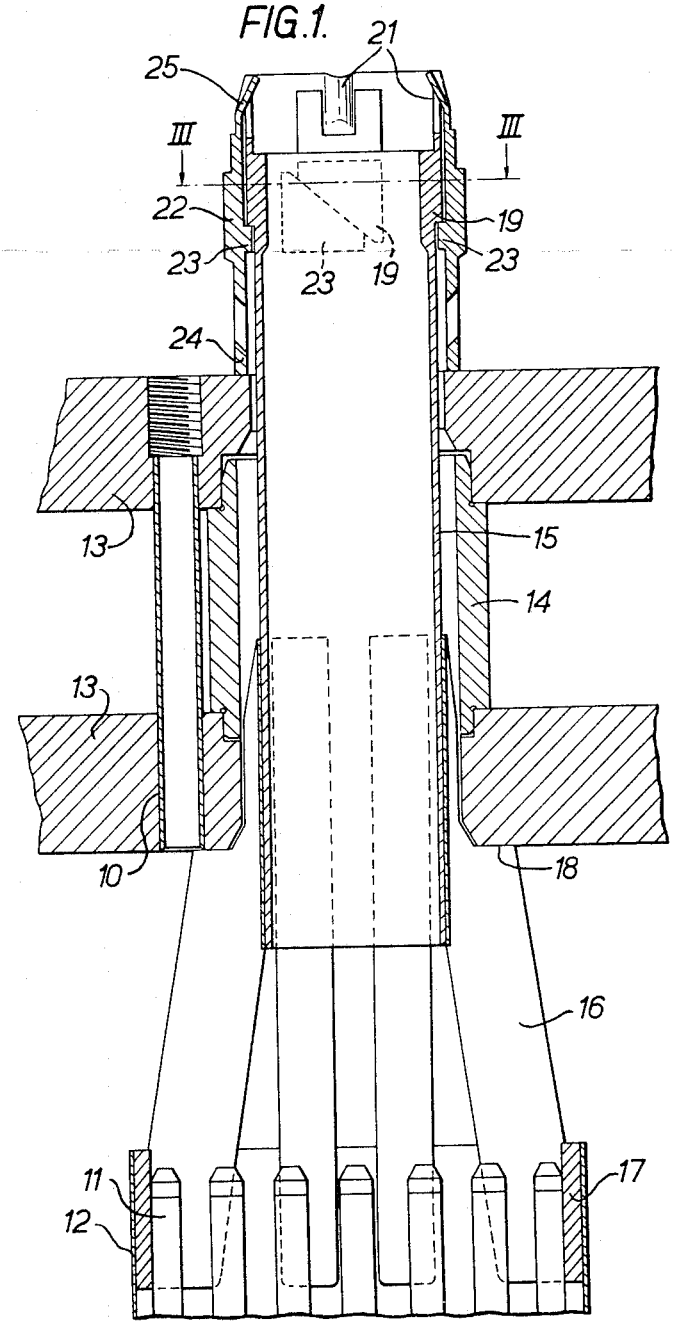
Figure 2:
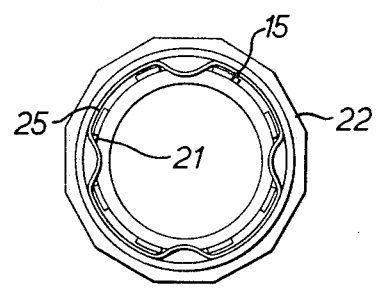
Figure 3:
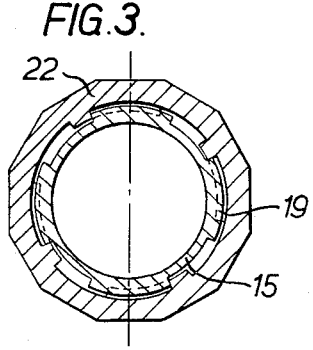

One nuclear fuel unit having an end fitting embodying the invention will now be described by way of example with reference to the accompanying drawing in which:

FIGURE 1 is a sectional view of the upper end of a fuel unit in position in a fuel support grid, FIGURE 2 is a plan view of the upper end of the unit, and FIGURE 3 is a sectional view of the line III—III of FIGURE 1.

The fuel unit now to be described comprises a cluster of elongate fuel rods 11 housed within a hexagonal fuel tube 12. At its upper end the fuel unit carries an end fitting by means of which it is secured to a fuel support grid which takes the form of two plates 13 which are spaced by tubular spacers 14. Aligned apertures in the plates 13 are encircled by the spacers 14. A tube 10 penetrating the plates 13 is provided to house instrumentation leads.

The fuel unit end fitting comprises a spindle 15 to penetrate the aligned apertures in the support grid, the spindle being secured to the fuel tube 12 by inclined struts 16 welded at their upper ends to the spindle and at their lower ends to a hexagon 17 itself welded into the upper end of the fuel tube. Each strut 16 has a shoulder 18 which abuts the lower plate 13 of the support grid and thus limits penetration of the spindle through the apertures in the support grid. At its upper end the spindle is threaded to receive a threaded nut 22. The co-operating threads 19 and 23 of the spindle and the nut respectively are of coarse pitch and are discontinuous, each being constituted by four arcuate segments (FIGURE 3) which are spaced to permit disengagement of the threads by partial rotation of the nut and thus axial displacement of the nut. Above the thread 19 the spindle is formed with four recesses in the form of axial slots 21. The nut 22 has an upper part 25 (FIGURES 1 and 2) which comprises a ring formed as an integral axial extension of the nut. This part 25 is reversibly deformable into locking engagement with the recesses in the spindle to counter rotation of the nut on the spindle. A lower part 24 of the nut abuts the upper plate 13 of the support grid.

To secure the fuel unit at its upper ends to the fuel support grid, the spindle 15 is passed through aligned apertures in the grid and the nut 22 is slid axially over the spindle and tightened by partial rotation on the spindle to engage the threads 19 and 23. After the nut has been tightened, it is locked by deforming the part 25 into one or more of the recesses 21 in the spindle to counter rotation of the nut on the spindle and thus to maintain the fuel unit firmly secured to the grid with engagement between the shoulder 18 and the lower grid plate.

In a marine reactor embodying fuel units secured to a fuel support grid as described above, the fuel units are suspended from the grid with their lower ends merely located against lateral movement. The end fitting serves to counter movement of the fuel unit relative to the support grid which might be induced by vertical accelerations of the reactor due to ship movement. The discontinuous threads in the end fitting eases the operation of releasing the nut from the spindle since the nut is disengaged from the spindle by partial rotation only; this reduces the risk of adhesion between the nut and the spindle such as might be generated by corrosion of the parts by a reactor coolant such as water or by deposit of impurities carried by the coolant. Also to reduce this risk of adhesion, radial clearance is provided between the threads 19 and 23 and adjacent walls of the nut and spindle.

It is to be understood that the invention is not limited by the details of the foregoing example; for instance the threads 19 and 23 might be constituted by three arcuate segments as opposed to the four segments shown in FIGURE 3.

What I claim is:
1. A nuclear fuel unit having an end fitting to secure the unit to a fuel support grid wherein the end fitting comprises a threaded spindle to penetrate an aperture in the grid, a shoulder to limit this penetration, a threaded nut to be screwed onto the spindle to secure said unit to said grid, the co-operating threads on the nut and the spindle being discontinuous and capable of disengagement by partial rotation of the nut to permit axial displacement of the nut, and locking means to counter rotation of the nut on the spindle.

2. A nuclear fuel unit as claimed in claim 1 wherein the locking means comprise a part carried by the nut which part is reversibly deformable into locking engagement with a recess in the spindle.

3. A nuclear fuel unit as claimed in claim 2 wherein the part comprises a deformable ring formed as an integral axial extension of the nut.

References Cited by the Examiner
UNITED STATES PATENTS

| | | | |
|---|---|---|---|
| 290,663 | 12/1883 | Blue | 285—391 X |
| 1,668,921 | 5/1928 | Miks | 285—391 X |
| 2,848,404 | 8/1958 | Treshow | 176—64 X |

BENJAMIN R. PADGETT, *Primary Examiner.*

LEON D. ROSDOL, *Examiner.*

M. J. SCOLNICK, *Assistant Examiner.*